Sept. 15, 1936.   L. F. NENNINGER ET AL   2,054,165
CONTROL MECHANISM FOR THE TRANSMISSION OF A MILLING MACHINE
Filed Nov. 13, 1931   7 Sheets-Sheet 1
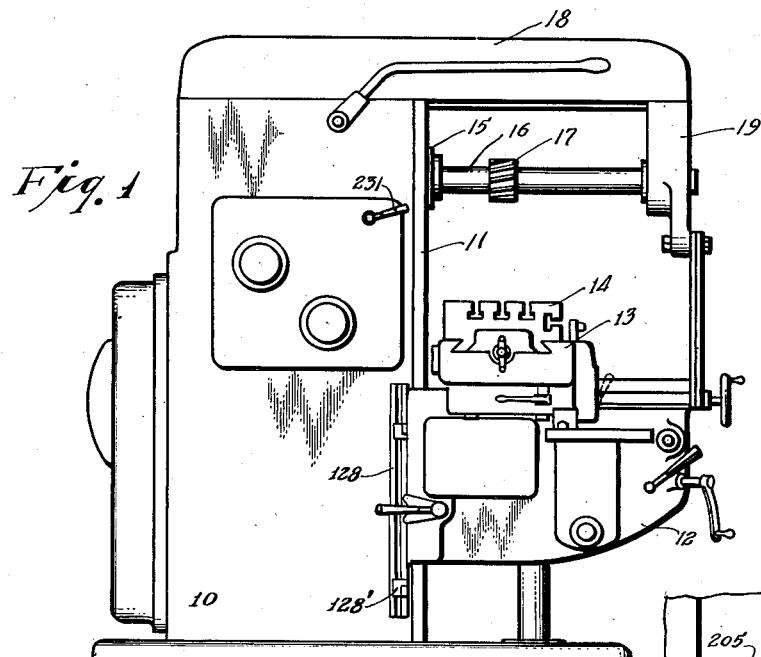
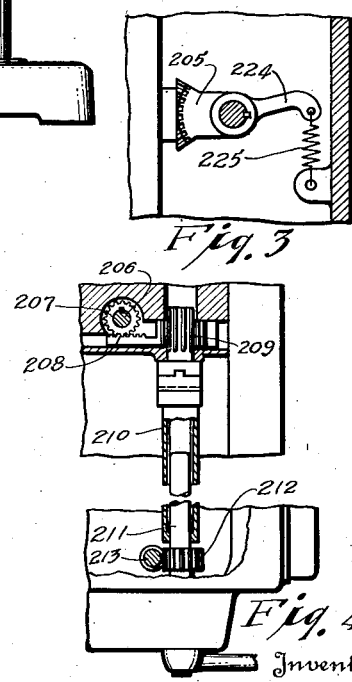
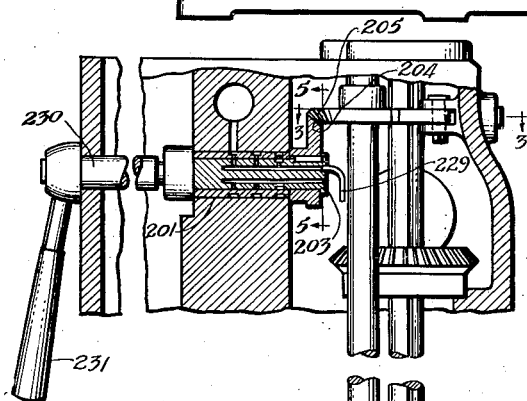
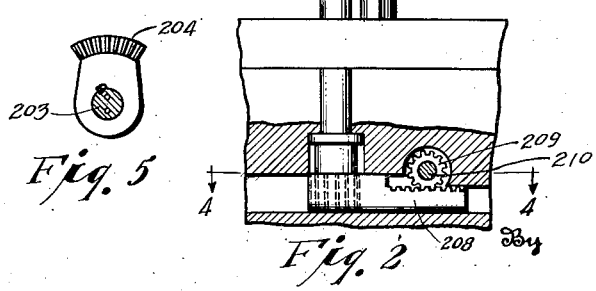
Inventor
LESTER F. NENNINGER
BERNARD SASSEN
By AHKParsons
Attorney

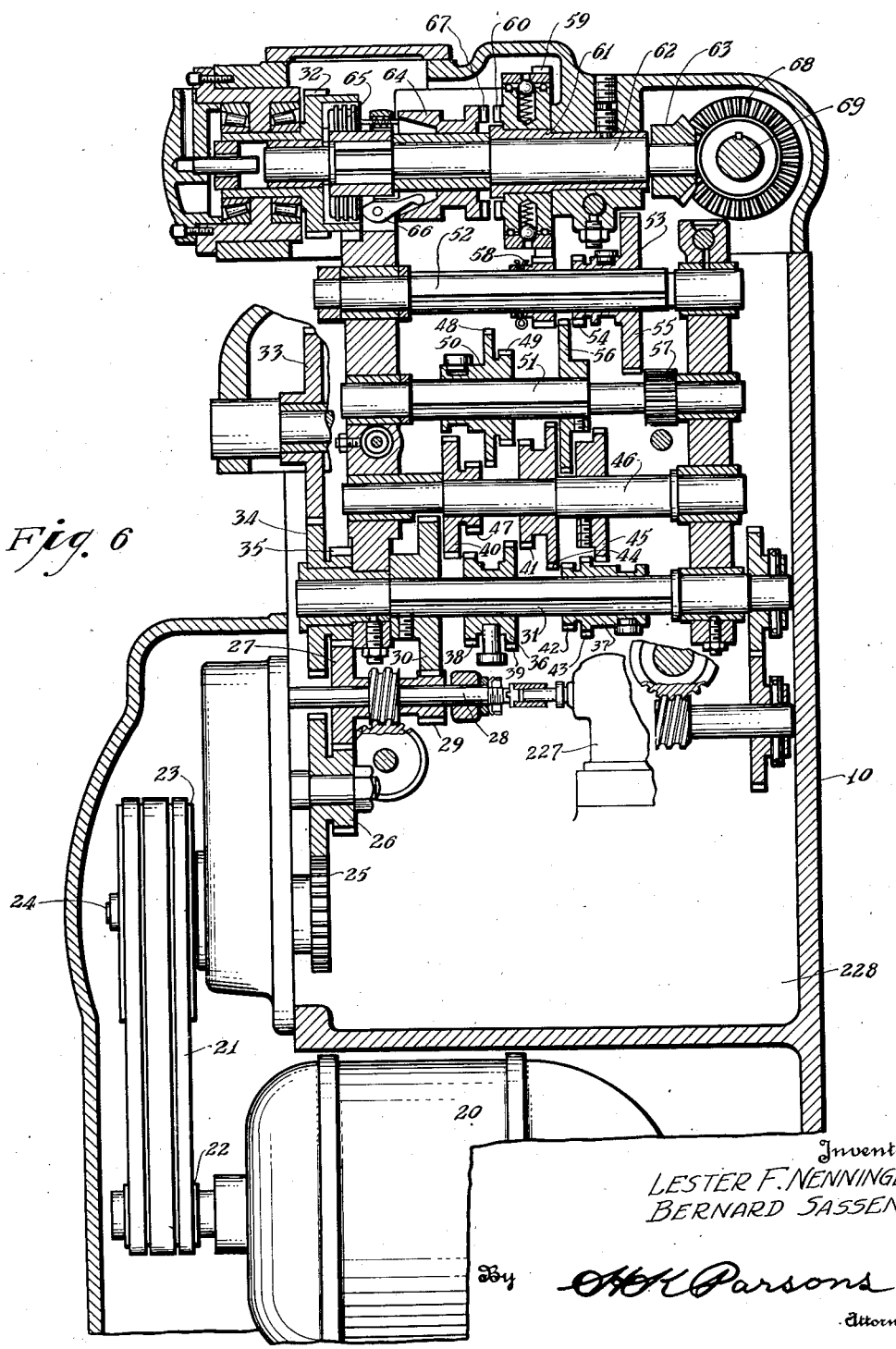

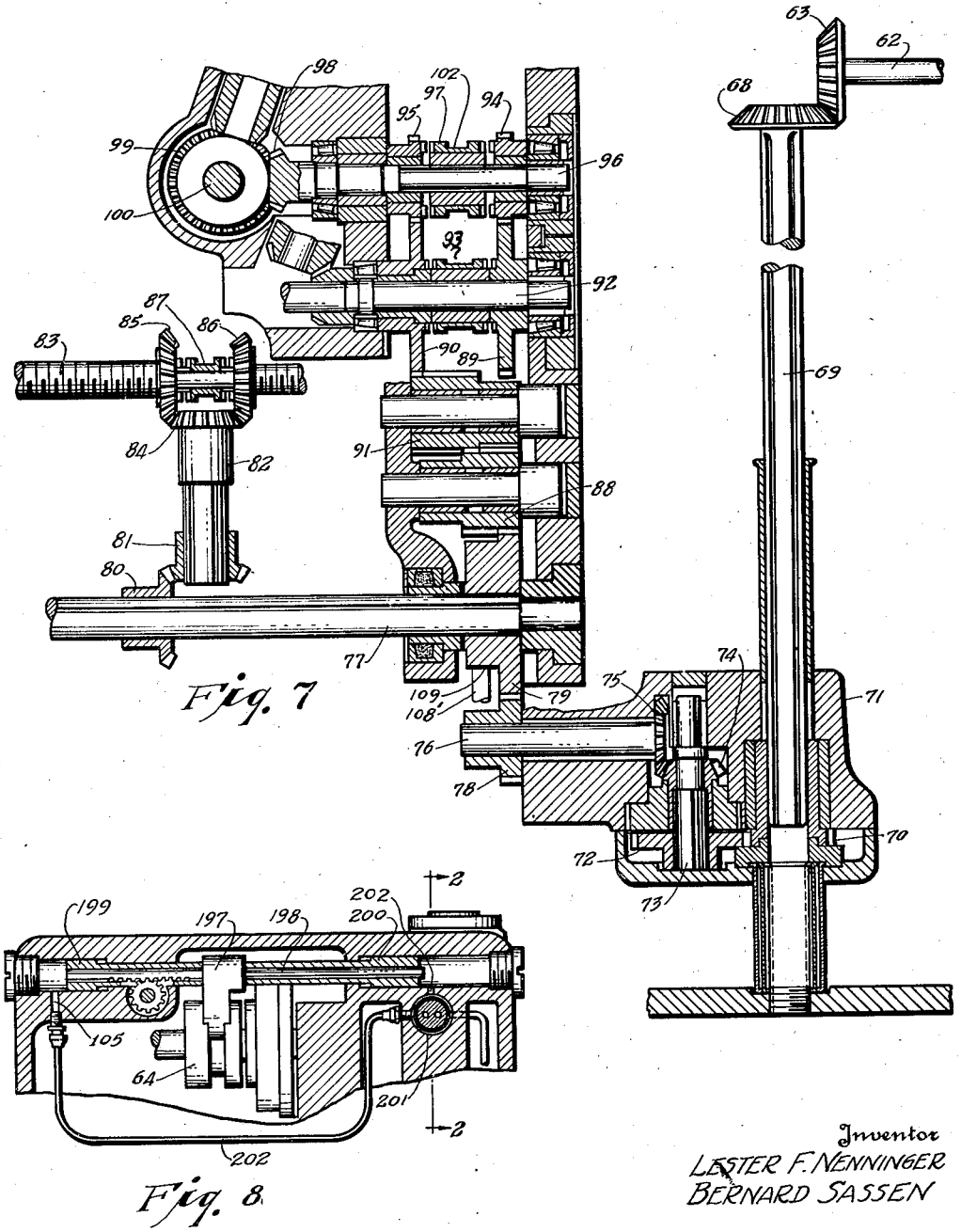

Sept. 15, 1936.   L. F. NENNINGER ET AL   2,054,165
CONTROL MECHANISM FOR THE TRANSMISSION OF A MILLING MACHINE
Filed Nov. 13, 1931   7 Sheets-Sheet 4

Inventor
LESTER F. NENNINGER
BERNARD SASSEN
By AHKParsons
Attorney

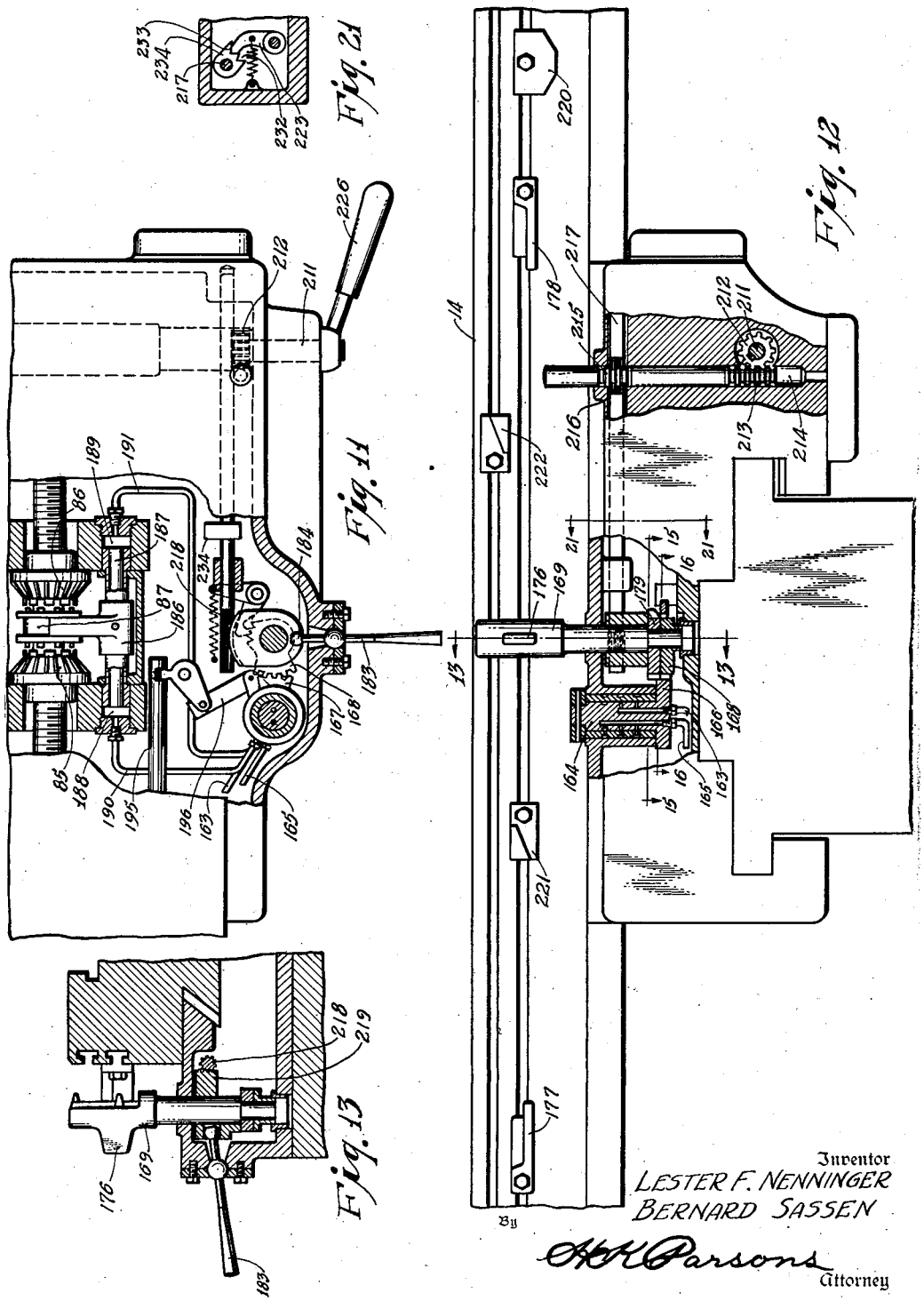

Sept. 15, 1936.   L. F. NENNINGER ET AL   2,054,165
CONTROL MECHANISM FOR THE TRANSMISSION OF A MILLING MACHINE
Filed Nov. 13, 1931   7 Sheets-Sheet 6

Inventor
LESTER F. NENNINGER
BERNARD SASSEN

A. H. Parsons
Attorney

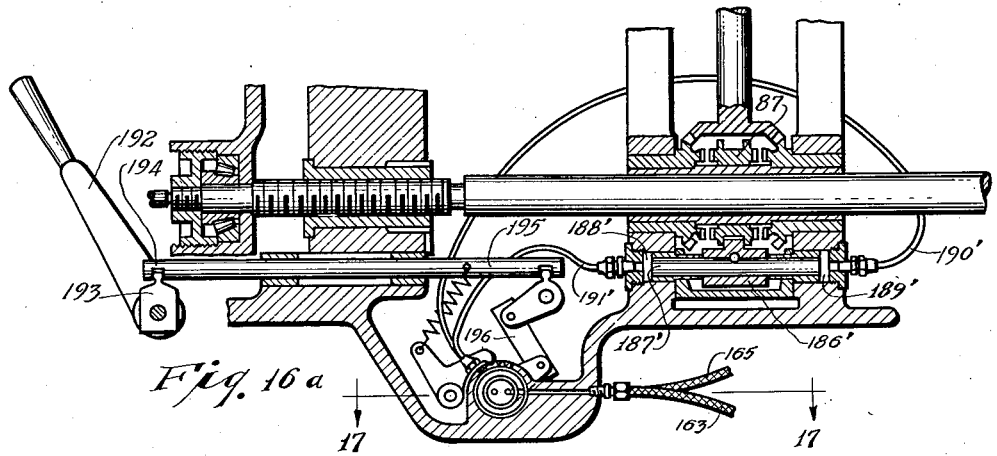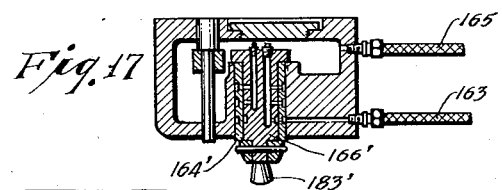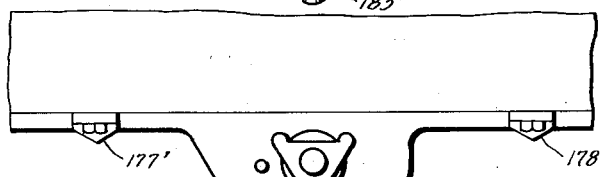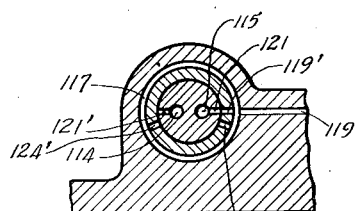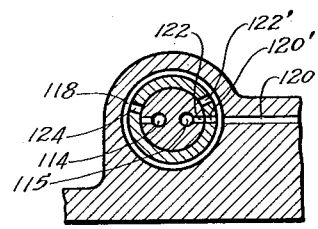
Inventor
LESTER F. NENNINGER
BERNARD SASSEN Patented Sept. 15, 1936

2,054,165

UNITED STATES PATENT OFFICE

2,054,165

CONTROL MECHANISM FOR THE TRANSMISSION OF A MILLING MACHINE

Lester F. Nenninger and Bernard Sassen, Cincinnati, Ohio, assignors to The Cincinnati Milling Machine Company, Cincinnati, Ohio, a corporation of Ohio Application November 13, 1931, Serial No. 574,800

12 Claims. (Cl. 90—21)

This invention relates to milling machines and more particularly to improvements in the transmission control mechanisms thereof.

One of the principal objects of this invention is to minimize the amount of effort required on the part of the operator to shift the various control levers and trip members of a milling machine.

Another object of this invention is to improve the operation of milling machines by so contriving the control mechanism which determines the relative movement between the work and cutter that the movement of any control lever as when effecting a change in rate or direction may be completed irrespective of whether the particular clutch shifted thereby has completed its movement or not.

A further object of this invention is to provide power means under dog or manual control for shifting the various rate and direction determining clutches of a machine tool thereby simplifying the control mechanism to the end that lighter construction may be utilized in its manufacture.

A still further object of this invention is to provide improved overload or torque limiting devices for the various rate and direction determining means for the movable parts of a milling machine so that the yielding or slip point of each clutch may be of different value for each support.

Other objects and advantages of the present invention should be readily apparent by reference to the following specification considered in conjunction with the accompanying drawings illustrative of one embodiment thereof but it will be understood that any modifications may be made in the specific structural details hereinafter disclosed within the scope of the appended claims without departing from or exceeding the spirit of the invention.

Referring to the drawings in which like reference numerals indicate like parts:

Figure 1 is an elevation of a milling machine embodying the principles of this invention.

Figure 2 is a section on the line 2—2 of Figure 8.

Figure 3 is a section on the line 3—3 of Figure 2.

Figure 4 is a fragmentary view partly in section as viewed on the line 4—4 of Figure 2.

Figure 5 is a detail end view of the rate determining clutch control valve as viewed on line 5—5 of Figure 2.

Figure 6 is an expanded view of the variable feed transmission for the work support members.

Figure 7 is an expanded view of the branch transmissions to the different support members.

Figure 8 is a detailed view of the operating cylinder for the rate determining clutch.

Figure 11 is a detail view of the table control mechanism.

Figure 12 is an elevation of the work support with parts broken away to show the control mechanism.

Figure 13 is a detail section on the line 13—13 of Figure 12.

Figure 16A is a modified form of table control mechanism.

Figure 17 is a section on the line 17—17 of Figure 16A.

Figure 18 is a detail showing the table control lever and operating dogs therefor.

Figure 19 is a section on the line 19—19 of Figure 9.

Figure 20 is a section on the line 20—20 of Figure 9.

Figure 21 is a section on the line 21—21 of Figure 12.

Figure 9:
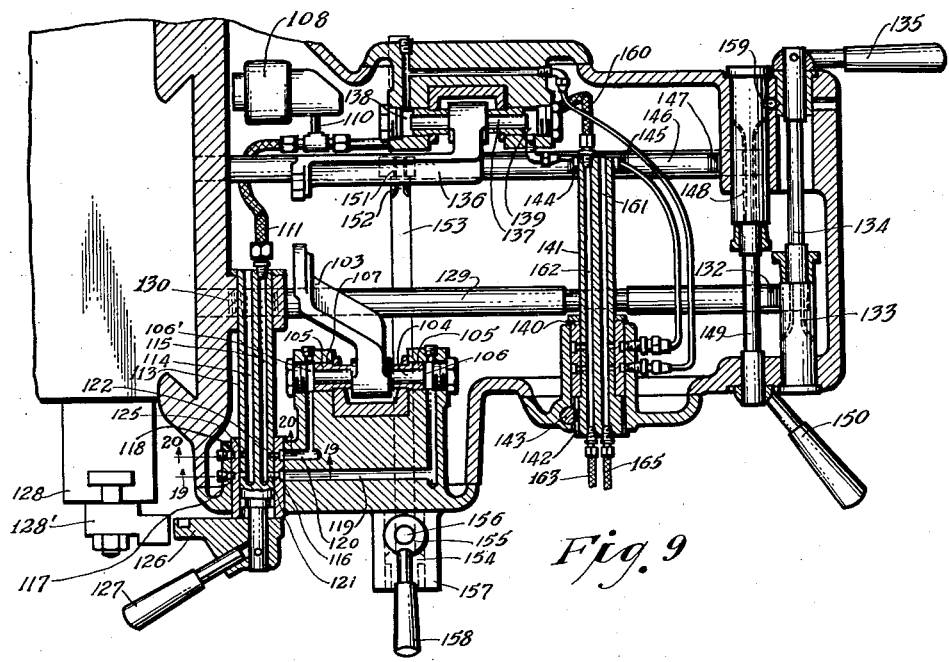
Figure 9 is a horizontal section through the knee showing the knee and saddle control mechanisms.

In the drawings the reference numeral 10 indicates the column of a milling machine having vertical guideways 11 formed upon one face thereof for reciprocably mounting thereon a knee 12 which carries for cross adjustment a saddle 13, the saddle in turn supporting a table 14 for reciprocating movement laterally of the saddle movement. The column also has journaled in the upper part thereof a spindle 15 for driving an arbor 16 upon which is secured a cutter 17 for operating upon work carried by the table. An overarm 18 is adjustably mounted on the column for supporting the outboard end of the arbor 16 through the medium of a pendant 19. These parts constitute the well known elements of a knee and column type milling machine.

The knee, saddle and table of this type of machine may be power actuated relative to the cutter and to each other in opposite directions and at different rates. For this purpose a transmission is provided, such as shown in expanded view in Figure 6, which is actuated by a prime mover 20 located in the base of the column. A power transmitting band 21 connects the pulley 22 of the motor with the pulley 23 secured to the end of the main drive shaft 24 having a gear 25 secured to the end thereof which is continuously driven during operation of the prime mover. This gear, through the gear couplet 26, actuates the spur gear 27 keyed to the shaft 28 which also has keyed thereon a pinion 29 meshing with the gear 30 secured to the primary shaft 31 of the variable feed transmission.

The gear 27 also actuates a rapid traverse transmission comprising a final driver 32 and the interposed gear train 33, 34, 35.

The variable feed transmission comprises the gear couplets 36 and 37 splined on the shaft 31 for constant rotation thereby, the couplet 36 including the gears 38 and 39 shiftable into mesh with the gears 40 and 41 respectively, while the couplet 37 has the gears 42 and 43 shiftable into mesh with the gears 44 and 45 respectively. These driven gears are all secured to a parallel shaft 46 which also has fixed therewith another gear 47 with which meshes the gear 48 of the couplet 50 slidably mounted on shaft 51, the other gear 49 of the couplet meshing with the gear 41 on the shaft 46. By means of the three shiftable couplets thus far described, the shaft 51 may be rotated at any one of eight different speeds. A fourth shaft 52 is journaled in the column parallel to the shaft 51 and has another shiftable gear couplet 53, comprising the gears 54 and 55, which are shiftable into mesh respectively, with the gears 56 and 57 fixed on the shaft 51. The shaft 52 also has fixed thereon a gear 58 meshing with the final element 59 of the feed transmission. The member 59 is a safety gear for permitting slippage in case of extreme overload to thereby prevent breakage of the parts. This safety gear has clutch teeth 60 formed on one face thereof and is mounted for free rotation on a sleeve 61 which is journaled on a shaft 62 having fixed to one end a bevel gear 63 and splined thereon intermediate of its length a clutch spool 64.

The gear 32 constitutes the exterior driving member of a friction disk clutch 65 having pivoted levers 66 adapted to effect engagement of the clutch upon movement of the clutch spool 64 to the left and thereby rotate the shaft 62 at a rapid traverse rate. Clutch spool 64 is also provided with clutch teeth 67 adapted to engage the clutch teeth 60 of the safety gear to thereby effect rotation of the shaft 62 at any one of the sixteen feed rates of which the feed transmission is capable.

As more particularly shown in Figure 7, the bevel gear 63 meshes with a bevel gear 68 secured to the end of a splined shaft 69 which is journaled in the column against axial movement and telescopingly engages a spur gear 70 journaled in a bracket 71 carried by the knee. Although the bracket is vertically movable with the knee it will be apparent that the driving connection between the shaft 69 and 70 will be maintained in all relative positions of the parts. The shaft 69 constitutes a common drive member for transmitting any feed rate or rapid traverse rate of which the transmission in the column is capable to any one of the three branch transmissions in the knee and the corresponding support coupled therewith.

For the actuation of these transmissions a drive train is provided comprising a spur gear 72, in mesh with the gear 70, keyed to the shaft 73, having a bevel gear 74 secured to the end thereof in mesh with a bevel gear 75 fixed to the end of a horizontal shaft 76. This shaft is coupled to a parallel shaft 77 by means of a pinion 78 and spur gear 79. The shaft 77 is splined for slidably receiving the bevel gear 80 meshing with the bevel gear 81 secured to the end of the shaft 82 which comprises a branch transmission for actuating the table. A table reverser is interposed between the shaft 82 and the table feed screw 83 including the bevel gear 84 keyed to the shaft 82 and the bevel gears 85 and 86 mounted for free rotation on the shaft 83 and the clutch 87 shiftable between these bevel gears for coupling one or the other to the feed screw in the usual manner of such reversers.

The gear 79 also acts as a common driver for the branch transmissions to the saddle and knee and for this purpose is in constant mesh with a wide faced pinion 88 which meshes directly with the gear 89 for effecting rotation thereof in one direction and indirectly with gear 90 through idler 91 for effecting rotation in the opposite direction, these two gears 89 and 90 being mounted for free rotation on the saddle feed shaft 92. A reversing clutch 93 is shiftably mounted between these gears for determining the direction of movement of the saddle in the well-known manner.

The gears 89 and 90 mesh respectively with gears 94 and 95 which are mounted for free rotation on an adjacent parallel shaft 96. A clutch member 97 is interposed between these gears in driving relation with the shaft 96 for effecting movement of the knee in opposite directions. The shaft 96 has a bevel gear 98 secured to the end thereof in mesh with the bevel gear 99 keyed to the upper end of the knee elevating screw 100.

From the preceding description it should now be apparent that a milling machine has been provided having three movable supports in the form of a saddle, table and knee together with power transmission for effecting actuation of these supports at variable feed rates or at a rapid traverse rate, and in either one of two directions, the determination of the rate for the three supports being under the control of a single clutch, while individual clutches have been provided for determining the directional movement of each support.

It is well known in the shifting of tooth type clutches that the amount of energy necessary to effect disengagement thereof depends upon the friction between engaging faces which varies with the amount of power being transmitted by the clutch. In a milling machine of the type under discussion this amount is sufficient to require the use of control mechanism having a certain mechanical advantage in order that they may be conveniently operated manually. Since considerable stress therefore is put upon the parts to effect the shifting movements it is apparent that they must be of sturdy construction.

It is desirable therefore that the various clutches be shifted by more direct and powerful means so that the control mechanism may be of lighter construction and the friction losses eliminated, thereby reducing the amount of power necessary to operate the machine.

In the present invention this has been accomplished by providing an auxiliary or intermediate power means which is directly coupled to the clutch, and which may be controlled by simple mechanism. Preferably this power means is of the hydraulic type as certain advantages result from its use due to the inherent qualities of this medium. For instance, the hydraulic pressure may be put under the control of a valve and the operating lever therefore may be moved immediately to an open or closed position by the operator without the necessity of waiting for the clutch teeth to interengage or mesh with one another such as would be necessary if the clutch was shifted through mechanical means as is usual in present construction.

With the shifting of the clutch under the control of a valve, the amount of energy or power necessary to turn the valve remains the same irrespective of the load being transmitted by the clutch and does not increase with the load being transmitted. The control mechanism may therefore be made of lighter construction which is more easily operated.

Figure 10:
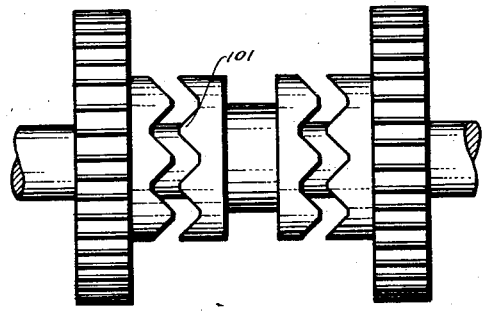
Figure 10 is an enlarged view of the safety or torque limiting clutch utilized in the feed transmission.
Figure 14:
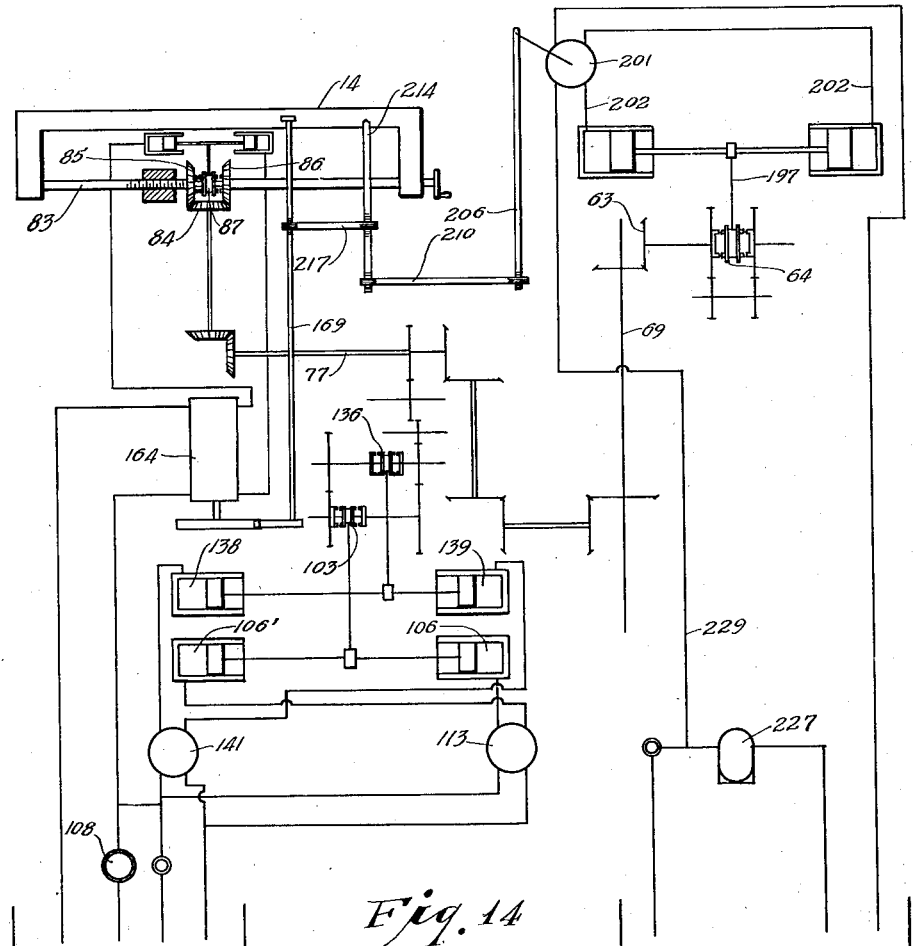
Figure 14 is a diagrammatic view of the work support transmission and control mechanism.

To further facilitate the shifting of the clutches and reduce the accompanying friction losses the clutch teeth 101 of the present invention have been beveled or inclined as is shown in Figure 10, which thereby reduces the amount of possible abutting areas tending to present engagement to a minimum. The bevel of these teeth may be made sharp thereby permitting greater friction to be created between the teeth which decreases the possibility of slippage or they may be made with a greater included angle approaching the flat which increases the possibility of slippage. In this manner the overload capacity of a clutch may be varied, and the clutches for the various supports may be different if it is desired that each support have a different overload or slippage point.

Referring to Figures 7 and 9 the reversal clutch 97 for the knee is provided with an annular groove 102 for receiving a shifter fork 103 secured to a piston rod 104 which is provided with sleeves 105 upon opposite ends, which are reciprocally mounted in cylinders 106 and 106' formed in the support casting. The sleeves are capable of independent movement relative to the pistons and are provided with shoulders 107 which engage the cylinder heads while their ends engage opposite sides of the shifter fork so that upon the admission of fluid pressure to both cylinders the clutch member 97 will be moved to a neutral or non-power transmitting position. Upon the release of pressure from one cylinder and the admission of pressure to the other, the clutch 97 will be shifted either into engagement with the gear 94 or the gear 95 to effect power traverse of the knee. This is effected by the hydraulic medium in the pressure cylinder acting on the end of the piston rod, causing it to move independent of the sleeve.

Fluid pressure is supplied to these cylinders from a plunger pump 108 located in the lower part of the knee, the plunger 108' of which is actuated by an eccentric 109 formed on the periphery of the gear 79 as shown in Figure 7. Since the gear 79 is constantly driven from the prime mover of the machine it will be apparent that fluid pressure is available at all times for power shifting of the clutches during operation of the machine. The pump 108 is provided with a suitable intake for withdrawing oil from a reservoir in the base of the knee and also with an outlet 110 which is connected by a suitable channel means 111 with a control valve 112.

This valve comprises a rotatable cylindrical member 113, having a pair of longitudinal bores 114 and 115 which are opened at one end and closed at the other, the pressure pipe 111 being threaded into the open end of the bore 115. A bushing 116 is fixed in the knee and rotatably receives one end of the member 113. This bushing is provided with a pair of annular grooves 117 and 118 which are in constant communication with channels 119 and 120 which extend respectively to the ends of cylinders 106 and 106'. A pair of radial ports 121 and 122 formed in the member 113 intersect the bore 115 and when as shown in Figures 19 and 20 these ports are simultaneously connected with the channels 119 and 120 through ports 119' and 120' formed in the sleeve, the fluid pressure will move clutch 97 to a neutral or non-power transmitting position.

The bushing has a port 123 formed in the annular groove 117 but angularly displaced from the port 119' and a port 124 formed in the annular groove 118 whereby upon rotation of the member 113 through a pre-determined angle to cause the port 121 to register with the port 123, fluid pressure will flow to cylinder 106, while the cylinder 106' will be connected through port 124 with the bore 114 which is open at the end as previously explained, permitting the fluid to return to reservoir at the base of the knee. Movement of the valve 113 counter-clockwise through a pre-determined angle will connect the port 122 with port 122' in the annular groove 118 and simultaneously connect the groove 117 through ports 121' and 124' with the channel 114 thereby causing the clutch 97 to be moved in the opposite direction to cause reverse movement of the knee.

The valve 113 is provided on the end with a lug 126 in which is secured a handle 127 for manual operation of the valve. A T slotted member 128 is secured to the side of the column to which trip dogs 128' may be secured for cooperation with the lug 126 to rotate the valve to neutral position and thereby limit upward or downward movement of the knee.

A shifter rod 129 is reciprocably mounted in the knee and provided with rack teeth 130 on one end engaging pinion teeth formed in the periphery of the member 113 and rack teeth 132 in the other end engaging pinion teeth 133 formed on the periphery of the shaft 134 which is journaled in the front of the knee and provided with operating lever 135 on one end. This linkage makes it possible to actuate the valve 113 from the operator's normal position at the front or rear of the machine. Suitable detent mechanism is provided for maintaining the levers in their various operating and neutral positions.

From the foregoing description it should now be apparent that the direction determining or reverser clutch for the knee is shifted by intermediate power means, which in the present instance is hydraulic, under the control of manual or dog actuated levers, the manual control being operable from either the front of the machine or from the side of the machine. It will be noted that the control levers may be immediately shifted to any one of its positions irrespective of whether the clutch controlled thereby has become engaged or not.

The saddle is provided with similar means for shifting its direction determining clutch 93 and includes a shifter fork 136 mounted upon double-ended piston 137 which is reciprocably mounted at opposite ends in cylinders 138 and 139. The admission of fluid pressure to these cylinders is controlled by the valve 140, which is similar in construction and operation to the control valve for the knee and its description therefore need not be repeated. The valve is provided with a rotatable member 141 which as shown in Figure 9 is provided with pinion teeth 142 engaging a rack plunger 143 reciprocably mounted in the knee casting adjacent the under side of the saddle for engagement by trip dogs carried thereby. The valve may thus be moved to neutral position by dogs carried by the saddle to terminate the movement of the same.

The valve is further provided with pinion teeth 144 formed on the opposite end thereof in engagement with rack teeth 145 formed in the periphery of the shifter rod 146 which is slidably mounted in opposite ends of the knee. The rod 146 is provided at one end with rack teeth 147 engaging rack teeth 148 formed on the periphery of the rotatable shaft 149 which extends through the wall of the knee at one side to receive an operating lever 150. The rod 146 is further provided with a socket 151 which is engaged by a lug 152 integral with the rotatable shaft 153 which extends across the knee and provided on the opposite end with a beveled gear 154 meshing with beveled gear 155 secured to the lower end of stub shaft 156. This shaft is journaled in a projection 157 on the side of the knee and provided on the upper end thereof with a manual control lever 158 whereby the operator may control saddle movement from his position at the side of the machine.

For various operating reasons it is not desirable to power actuate the saddle and the knee simultaneously and therefore to prevent accidental engagement of both the saddle and knee clutches, inter-locking means have been provided comprising a ball 159 which is mounted in a recess between the control shafts 149 and 134 each shaft having an indent therein which is opposite to the ball 159 when the controlling shafts are in neutral position. Upon movement of one shaft or the other to a power transmitting position, the ball will be moved into the indent of the other control shaft thereby preventing its movement until the previous lever is returned to neutral position.

Hydraulic pressure is supplied to the control valve 140 of the saddle through the flexible channel 160 from the pump 108 previously described. The saddle control valve 140 is provided with an outlet 161 by which exhaust fluid is returned to the reservoir in the knee. The pressure channel 162 of the saddle control valve extends to the opposite end of the valve where it has threaded therein a flexible pipe 163 by means of which pressure is conducted to the table control valve 164 shown in Figure 12. The outlet channel 161 also has threaded in one end a flexible conductor 165 by means of which exhaust fluid from the table control valve is returned to the reservoir in the knee. It will thus be seen that the saddle movement may be manually controlled from the front or rear of the machine as well as automatically controlled by dogs mounted on the saddle and that the saddle control valve is in series with the table control valve whereby pressure from the pump passes to the saddle control valve and then to the table control valve, returning in the same order to reservoir.

Figure 15:
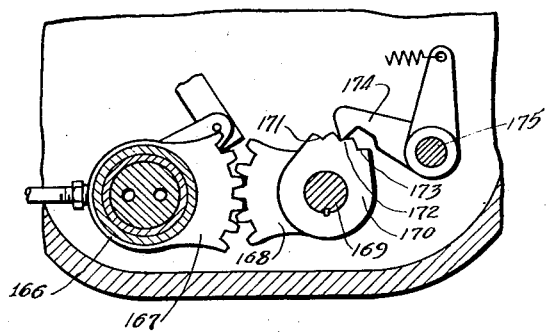
Figure 15 is an enlarged detail view on the line 15—15 of Figure 12.

The directional movements of the table are controlled by the previously mentioned valve 164 which is similar in construction to the saddle and knee control valves and comprises a rotatable member 166 to which are connected the flexible conductors 163 and 165 as previously explained. The member 166 is provided with a segmental gear portion 167, Figure 11, which engages a similar segmental gear 168 keyed to the end of a rotatable and reciprocable control plunger 169. Rotation of the plunger 169 will cause rotation of the valve member 166 and thereby a change in direction in the movement of the table. The valve and the plunger have a neutral position in which the table is stopped. A detent mechanism has been provided for holding the plunger in any one of three positions and as shown in Figure 15 comprises the member 170 having three indents 171, 172 and 173 engageable by the spring pressed detent 174 pivotally mounted upon a fixed pin 175. The control plunger is provided with a projecting ear 176 which is engageable by suitable dogs 177 and 178 mounted in T-slots on the forward edge of the table for rotating the plunger from either power transmitting position to a neutral position.

As previously mentioned the plunger 169 is reciprocable and this is for the purpose of controlling a rate determining clutch whereby the movement of the table is changed from feed to rapid traverse or vice versa. Upon vertical movement of the plunger a second member 179 carried thereby is moved to a position opposite the detent 174. This member, unlike the member 170, is provided with only two indents 180 and 181 whereby the plunger upon sufficient dog rotation to cause the detent 174 to ride over the peak 182 between the indents will be fired to effect reversal in the table movement. This acts as a load and fire mechanism for automatically reversing the table. The control plunger may also be moved up or down or rotated manually by the control lever 183 which is mounted for universal movement in the wall of the saddle and provided with a ball shaped end 184 engaging a similarly formed socket 185 formed in the plunger. The direction determining clutch 87 for the table is provided with a shifter fork 186 mounted intermediate the ends of the piston 187 which is reciprocable in closed cylinders 188 and 189 formed on the saddle casting and connected to the control valve 164 through flexible channels 190 and 191. The control valve 164 may also be rotated from the rear of the machine by means of a control lever 192 which is pivotally mounted to the under side of the saddle and provided with lug 193 engaging a socket 194 formed in the periphery of the reciprocating control rod 195 which is operably connected at the other end through crank mechanism 196 with the member 166.

From the foregoing it will be seen that the table may be manually controlled from either the front or rear of the machine as well as automatically controlled from trip dogs mounted on the table.

The rate determining clutch 64 previously referred to as mounted in the column is hydraulically shifted in a manner similar to that described in connection with the other clutches and includes a shifter fork 197, Figure 8, fixed intermediate the ends of the piston rod 198 which is reciprocably mounted at opposite ends in cylinders 199 and 200. The control valve 201 is provided for this clutch and is connected to the cylinders through channels 202. This control valve is adapted to be automatically actuated from trip dogs carried by the table and to this end the rotatable member 203 of the valve 201 is provided with a beveled gear segment 204 shown more particularly in Figure 5 for engagement with bevel gear 205 keyed to the end of the vertical rotatable shaft 206. This shaft extends parallel to the side of the column and at the lower end is splined in a pinion gear 207 carried by the knee meshing with teeth on the rack bar 208 which also engages pinion 209 on the end of the horizontal shaft 210. The shaft 210 is telescopingly splined to the shaft 211 which is journaled in the forward part of the saddle and fixed against longitudinal movement relative thereto. A pinion 212 mounted on the shaft 211 engages rack teeth 213 (Figure 12) formed in a reciprocating plunger 214 the upper end of which is provided with rack teeth 215 engaging pinion teeth 216 formed on the rotatable shaft 217 the other end of which is provided with similar pinion teeth 218 as shown in Figure 13 engaging rack teeth 219 formed on the plunger 169. The plunger 214 projects above the top of the saddle and is adapted to be engaged by a suitable dog 220 carried on the front edge of the table for depressing the plunger to effect dis-engagement of the rate clutch upon movement of the table to an extreme position thereby preventing damage or breakage of the operating parts. The connecting mechanism just described makes it possible for the plunger 169 to operate the rate determining control valve in the column from dogs 221 and 222 carried by the table. Detent mechanism has also been provided for the rate determining clutch and comprises a spring pressed detent 223 as shown in Figure 21 engageable with indents 232 and 233 formed in the periphery of the member 234 secured to the shaft 217.

The shaft 211 is extended to the forward side of the saddle and provided with a lever 226 whereby the rate determining clutch may be shifted manually.

In order that the manual shifting of lever 226 may be performed when the plunger 169 is in neutral and the table stopped, as for instance when imparting rapid traverse to the saddle or knee, lost motion is provided between the pinion 212 and its shaft and the shaft 206 is provided with an arm 224 whereby a spring 225 acting on the arm will normally maintain the valve 201 in such position that the feed clutch will be engaged. Upon upward movement of the handle, the shaft 210 will be rotated without transmitting motion to the plunger 169 which would be incapable of vertical movement anyway while in a vertical position due to the overlap of the peak 182 on the detent 174. The plunger 169 when in power transmitting position is still capable of rotating the pinion 212 and shaft 211 in a counter-clockwise direction and upon return movement of the pinion 212, the spring 225 will cause the shaft 211 to follow up.

The rate and direction control valve 201 is supplied with fluid pressure from a pump 227 which is operated directly from the shaft 28 as shown in Figure 6. This pump draws fluid from a reservoir 228 located in the lower part of the column and forces it through conduit 229 to the control valve. A shaft 230 is coupled to the end of the control valve and extends across the column and through the opposite wall where it is provided with an operating lever 231. As shown in Figure 1 this permits the operator to directly control the rate and direction clutch from that side of the machine.

Figure 16:
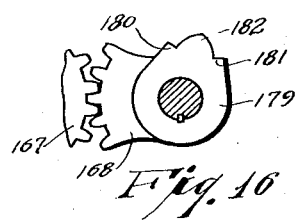
Figure 16 is a detail view on the line 16—16 of Figure 12.

A modified form of the invention is shown in Figures 16A, 17 and 18 in which a separate direction control for the table is shown for use in tool room machines where reciprocating cycles are not necessary. It will be noted that the construction is similar to that shown in Figure 11 with the exception that there is no automatic control for the rate determining clutch coupled therewith. In this case the dogs 177' and 178' simply rotate the control lever 183' from a power transmitting position to a neutral position.

There has thus been provided a milling machine having a transmission control mechanism in which the control levers may be easily and quickly moved from one position to another by intermediate power means under either manual or dog operated control means and the mechanism is so contrived that the movement of these levers may be completed irrespective of whether the clutch controlled thereby has completed its movement or not. It will also be noted that the rate and direction determining clutch in the column is shiftable by hydraulic means which is under the control of mechanical mechanism carried by the saddle for manual or dog operation from the table. It will also be noted that means have been provided on the table for operating this mechanism to automatically shift the rate determining clutch from rapid traverse to feed in case the table has reached the end of its travel unobserved by the operator thereby acting as a safety feature and reducing possible damage to the parts.

That which is claimed is:

1. A milling machine having a column, a cutter spindle rotatably mounted on the column, a work support including a saddle and table adjustably mounted on the column for movement relative to the spindle, a prime mover, a feed transmission and a rapid traverse transmission actuated by said prime mover, a rate determining clutch for coupling the table with either the feed transmission or the rapid traverse transmission, hydraulically actuated means for shifting said rate determining clutch, said clutch being mounted in the column of the machine and means carried by the saddle under control of trip dogs mounted on the table for controlling the operation of said hydraulically actuated means and thereby the rate of movement of the table.

2. In a milling machine having a movable work support, the combination of transmission mechanism therefor including feed and rapid traverse clutch elements, and a clutch member shiftable in the one direction to engage said feed element and in the other direction to engage said rapid traverse element, said feed element being actuated by a safety gear, hydraulic means for shifting said clutch element, trip controlled means therefor including a plunger having a feed position and a rapid traverse position corresponding to the positions of the clutch, means actuated by the clutch element to effect translation of the work support including a table feed screw and nut, and trip means carried by the table and actuable when the feed nut has reached the limit of travel in either direction relative to the feed screw to move the plunger and thereby the clutch to a feed position whereby slippage will take place in the safety gear to prevent damage to the table translating elements.

3. A milling machine having a movable support, power transmission means for actuating said support including independent rate and direction determining clutches, hydraulic means for shifting said clutches including rate and direction control valves, a control plunger capable of axial and rotative movement, motion transmitting means coupling said plunger with one of said valves for actuation thereby upon axial movement of the plunger, additional motion transmitting means coupling the plunger with the other valve for actuation thereby upon rotative movement of the plunger, different dogs carried by the support for automatically effecting different of said movements and load and fire mechanism associated with the control plunger to insure completion of initiated movement thereof by the dogs.

4. A milling machine having a column, a knee mounted on the column for vertical movement relative thereto, a saddle movable on the knee toward and from the column, a table reciprocably mounted on the saddle, a power operated member journaled in the knee, branch transmissions extending from said member to each support for actuation thereof, a control clutch in each branch transmission, hydraulically actuated means for shifting said clutches, a pump located in the base of the knee and actuated by said power member for supplying hydraulic pressure and control means for determining the coupling of pressure to said hydraulically actuated means and thereby the member to be moved.

5. A milling machine having a column, a work support mounted on the column for movement relative thereto, a prime mover mounted in the column, a feed transmission and a rapid traverse transmission actuated by the prime mover and terminating in clutch elements, a rate determining clutch journaled in the column for selective coupling with said clutch elements, power transmitting means coupling the rate clutch with said movable support for power actuation thereby, hydraulically actuated means for shifting said clutch, a pump mounted in the column and actuated by said prime mover for supplying fluid pressure to said hydraulically actuated means and means adjacent the work support for determining the coupling of pressure to the hydraulically actuated means and thereby the rate of movement of the support.

6. A milling machine having a column, a knee, saddle and table mounted on the column for movement relative thereto and with respect to each other, means for effecting said movement including a prime mover mounted in the column, a feed and rapid traverse transmission actuated thereby, said transmission terminating in clutch elements, a clutch member journaled in the column in interposed relation with said elements for selective coupling therewith to determine the rate of movement of the movable supports, hydraulic means for shifting said clutch, a control valve for determining the coupling of said hydraulic means, a control lever mounted on the knee and directly coupled to said valve for manual actuation thereof, trip control means adjacent said table for actuating said control valve, and a lost motion connection between the trip control means and the manual means whereby the manual means may be operated without disturbing the position of the trip control means.

7. A milling machine having a column, a work table, a member for supporting the work table on the column for movement relative thereto, a prime mover mounted in the column, means for coupling the prime mover to the table for actuation thereby including a variable feed transmission and rapid traverse transmission mounted in the column, a final support actuating means, a feed-rapid traverse clutch selectively shiftable to connect the transmissions to the final actuating means, fluid operable means for shifting said clutch, means actuated by the prime mover for supplying fluid pressure thereto, a valve for controlling the admission of pressure to said fluid actuated means, said valve being supported by the column, a reverser clutch in series with the final actuating means, fluid operable means for shifting said clutch, means in the support member driven by the final actuating means for supplying pressure to the reverser clutch operating means, a control valve therefor, and trip mechanism carried by the support in operative relation to the table for automatically positioning both of said control valves.

8. In a milling machine the combination with a movable support of power actuated transmission means for moving said support including a fluid actuated rate determining clutch and a fluid actuated direction determining clutch, an independent source of pressure and control valve for each clutch, a common control member operatively connected to each valve and movable in one plane to position one valve and in a different plane to position the other valve.

9. A machine tool having a support, a table carried by the support, a prime mover mounted in the support, a transmission coupling the prime mover for actuation of the table including a two-position rate determining clutch and a three position direction determining clutch, a pair of fluid operable pistons connected with each clutch for shifting the same, a branch transmission and a pump operable thereby for supplying fluid pressure to said pistons, a three-position valve for said direction determining clutch, a two-position valve for said rate determining clutch, a control member, control connections between each of said valves and said member, and a plurality of different control dogs carried by the table and effective on said control member in a different manner for actuating through the different control connections the respectively coupled valves for automatic cycle control of the table.

10. A milling machine having a column, a tool support journaled in the column, a knee, saddle and table carried by the column for adjustment of work in three directions relative to the spindle, a prime mover mounted in the column, a feed transmission and a rapid traverse transmission continuously actuable by the prime mover and mounted in the column, said transmission including a final drive shaft extending to the knee, branch transmissions extending from the drive shaft to the respective supports and each including a reverser clutch and a pair of fluid operable pistons for shifting the same, an additional branch transmission actuated by said shaft, a pump for supplying fluid pressure for said pistons, a three-position control valve associated with each pair of pistons and having a pressure port connected with said pump, each valve having manually operable means for shifting the same to any one of its three positions, and automatic means individual to the respective valves for shifting the same from either one of two positions to a common third position.

11. A milling machine having a column, a tool support journaled in the column, a knee, saddle and table carried by the column for adjustment of work in three directions relative to the spindle, a prime mover mounted in the column, a feed transmission and a rapid traverse transmission continuously actuable by the prime mover and mounted in the column, said transmission including a final drive shaft extending to the knee, branch transmissions extending from the drive shaft to the respective supports and each including a reverser clutch and a pair of fluid operable pistons for shifting the same, an additional branch transmission actuated by said shaft, a pump for supplying fluid pressure to said pistons, a three-position control valve associated with each pair of pistons and having a pressure port connected with said pump, each valve having a manual control lever positioned for operation from the front of the machine and a second manually operable lever located for operation at the rear of the machine, control connections between each lever and it respective valve for shifting the same from any one of its three positions to any other of said positions, and individual trip operable means associated with each support for shifting its respective control valve from either one of two operating positions to a common third or stop position.

12. A milling machine having a column, a tool support journaled in the column, a knee, saddle and table carried by the column for adjustment of work in three directions relative to the spindle, a prime mover mounted in the column, a feed transmission and a rapid traverse transmission continuously actuable by the prime mover and mounted in the column, said transmission including a final drive shaft extending to the knee, branch transmissions extending from the drive shaft to the respective supports and each including a reverser clutch and a pair of fluid operable pistons for shifting the same, an additional branch transmission actuated by said shaft, a pump for supplying fluid pressure for said pistons, a three-position control valve associated with each pair of pistons and having a pressure port connected with said pump, each valve having a manual control lever positioned for operation from the front of the machine and a second manually operable lever located for operation at the rear of the machine, control connections between each lever and its respective valve for shifting the same from any one of its three positions to any other of said positions, individual trip operable means associated with each support for shifting its respective control valve from either one of two operating positions to a common third or stop position, and means associated with one of said supports selectively positionable to cause said automatic means to shift the valve from either of its two operating positions to a third position to stop support movement, or to shift said valve from one operating position to the other to automatically change the direction of movement of the support.

LESTER F. NENNINGER.
BERNARD SASSEN.